US010268320B2

(12) United States Patent
Westerman et al.

(10) Patent No.: US 10,268,320 B2
(45) Date of Patent: Apr. 23, 2019

(54) METHOD FOR DISAMBIGUATING MULTIPLE TOUCHES ON A PROJECTION-SCAN TOUCH SENSOR PANEL

(75) Inventors: Wayne Carl Westerman, Burlingame, CA (US); Martin Paul Grunthaner, Mountain View, CA (US); Steven Porter Hotelling, Los Gatos, CA (US); Christopher Tenzin Mullens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 927 days.

(21) Appl. No.: 12/852,133

(22) Filed: Aug. 6, 2010

(65) Prior Publication Data
US 2012/0032895 A1    Feb. 9, 2012

(51) Int. Cl.
*G06F 3/044* (2006.01)
(52) U.S. Cl.
CPC .... *G06F 3/044* (2013.01); *G06F 2203/04104* (2013.01)
(58) Field of Classification Search
CPC . G06F 3/044; G06F 2203/04112–2203/04113; G06F 3/041; G06F 3/0416; G06F 3/0418; G06F 3/046; G06F 3/0412; G06F 3/045; G06F 3/04883; G06F 3/03545; G06F 3/0488; G06F 3/0436; G06F 2203/04111; G06F 2203/04103; G06F 2203/04808; G06F 2203/04104; G06F 1/1626
USPC .............................. 345/173; 178/18.01–18.06
See application file for complete search history.

(56) References Cited

U.S. PATENT DOCUMENTS

| 5,483,261 A | 1/1996 | Yasutake |
| 5,488,204 A | 1/1996 | Mead et al. |
| 5,606,346 A * | 2/1997 | Kai et al. ...................... 345/173 |
| 5,825,352 A | 10/1998 | Bisset et al. |
| 5,835,079 A | 11/1998 | Shieh |

(Continued)

FOREIGN PATENT DOCUMENTS

| CN | 101535933 A | 9/2009 |
| CN | 101763199 A | 6/2010 |

(Continued)

OTHER PUBLICATIONS

International Search Report dated Dec. 1, 2011, for PCT Application No. PCT/US2011/046837, filed Aug. 5, 2011, five pages.

(Continued)

*Primary Examiner* — Nalini Mummalaneni
(74) *Attorney, Agent, or Firm* — Morrison & Foerster LLP (57) ABSTRACT

A touch sensor panel is disclosed. The touch sensor panel includes a plurality of rows, at least one of the rows being a split row including a plurality of row subsections; and a plurality of columns, at least one of the columns being a split column including a plurality of column subsections. The touch sensor panel is configured with at least one split row and at least one split column located to increase a likelihood that a touch anywhere on the touch sensor panel overlaps with at least one split row and at least one split column. The rows and columns are individually charged electrodes capable of detecting a change in capacitance in a corresponding area of the touch sensor panel.

25 Claims, 9 Drawing Sheets

(56) References Cited

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,274,488 | B2 * | 9/2012 | Bae ................. 345/173 |
| 8,479,122 | B2 | 7/2013 | Hotelling et al. |
| 2006/0026521 | A1 | 2/2006 | Hotelling et al. |
| 2006/0097991 | A1 * | 5/2006 | Hotelling et al. ........... 345/173 |
| 2006/0197753 | A1 | 9/2006 | Hotelling |
| 2007/0074914 | A1 * | 4/2007 | Geaghan et al. .......... 178/18.06 |
| 2008/0111795 | A1 | 5/2008 | Bollinger |
| 2009/0267916 | A1 | 10/2009 | Hotelling |
| 2009/0273579 | A1 | 11/2009 | Zachut et al. |
| 2009/0284495 | A1 * | 11/2009 | Geaghan ............... G06F 3/0416 345/174 |
| 2010/0007631 | A1 | 1/2010 | Chang |
| 2010/0026655 | A1 | 2/2010 | Harley |
| 2010/0066701 | A1 | 3/2010 | Ningrat |
| 2010/0090976 | A1 | 4/2010 | Liao et al. |
| 2010/0134422 | A1 * | 6/2010 | Borras ......................... 345/173 |
| 2010/0156811 | A1 * | 6/2010 | Long ....................... G06F 3/044 345/173 |
| 2010/0289774 | A1 * | 11/2010 | Pan ......................... G06F 3/044 345/175 |
| 2010/0328255 | A1 * | 12/2010 | Ishizaki .................. G06F 3/044 345/174 |
| 2011/0095997 | A1 * | 4/2011 | Philipp ....................... 345/173 |
| 2011/0141051 | A1 | 6/2011 | Ryu |
| 2011/0148435 | A1 * | 6/2011 | Schwartz ............. G06F 3/0416 324/658 |

FOREIGN PATENT DOCUMENTS

| | | | | |
|---|---|---|---|---|
| CN | 102232208 A | 11/2011 | | |
| JP | 2000-163031 A | 6/2000 | | |
| JP | 2002-342033 A | 11/2002 | | |
| WO | WO 9615464 A1 * | 5/1996 | ............ | G01V 3/088 |
| WO | WO-2010/019004 A2 | 2/2010 | | |
| WO | WO-2010/019004 A3 | 2/2010 | | |
| WO | WO-2012/019150 A1 | 2/2012 | | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report dated Apr. 5, 2016, for CN Application No. 201180046394.9, with English translation, four pages.

Chinese Search Report dated Nov. 21, 2016, for CN Application No. 201180046394.9, with English translation, four pages.

\* cited by examiner

METHOD FOR DISAMBIGUATING MULTIPLE TOUCHES ON A PROJECTION-SCAN TOUCH SENSOR PANEL

FIELD

This relates generally to touch sensor panels and methods for detecting simultaneous multiple touches on a touch sensor panel, and more particularly, to projection-scan multi-touch touch sensor panels and methods for disambiguating multiple touches on projection-scan touch sensor panels.

BACKGROUND

In recent years, touch sensor panels, touch screens, and the like have become available as input devices. Touch screens, in particular, are becoming increasingly popular because of their ease and versatility of operation as well as their declining price. Touch screens can include a touch sensor panel, which can be a clear panel with a touch-sensitive surface, and a display device, such as an LCD panel, that can be positioned partially or fully behind the touch sensor panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch event and the position of the touch event on the touch sensor panel, and a computing system can then interpret the touch event in accordance with the display appearing at the time of the touch event, and thereafter can perform one or more actions based on the touch event.

Touch sensor panels can include an array of touch sensors capable of detecting touch events (the touching by an object such as a finger upon a touch-sensitive surface). Some current touch panels are able to detect multiple touches (e.g., the touching of multiple fingers upon a touch-sensitive surface at distinct locations at about the same time) and near touches (e.g., fingers within the near-field detection capabilities of their touch sensors), and identify and track their locations. However, in some touch sensing technologies such as projection-scan touch sensing, the location of multiple touches cannot be unambiguously determined.

SUMMARY

Embodiments of this disclosure provide modified projection-scan touch sensor panel hardware and corresponding methods for disambiguating the locations of multiple touches on these modified projection-scan touch sensor panels. In general, a modified projection-scan touch sensor panel is disclosed where a number of the electrodes (rows and/or columns) can be partitioned into multiple sections to aid in the disambiguation of multiple touches. With this type of electrode partition, a ratio of touch from a split conductive region (i.e., split columns and rows) can be determined and used to estimate the location of one or more touches on a non-split conductive region.

In various embodiments, different rows and columns of a projection-scan touch sensor panel can be split into subsections. In addition, different numbers of the rows and/or columns can be split into two or more subsections. If a row or column is split to more than two subsections, the ratio can be calculated among all of the subsections and reflect the portions of a touch over each subsection. However, the number of breaks in a projection-scan touch sensor panel can be kept to a minimum while still collecting enough data to enable the processor to disambiguate multiple touches on the panel (i.e., to avoid rotational ambiguity caused by multiple touches detected simultaneously.) To minimize the number of breaks needed for disambiguating multiple touches, the breaks can be incorporated into certain rows and columns to ensure that a touch can always overlap with a single row split and a single column split regardless of the location of the touch on the surface of the touch sensor panel.

There are a number of methods to estimate the distribution of a touch over a whole row or column according to embodiments of this disclosure. In a first embodiment, the signal detected by a whole row (i.e., a row not physically split into subsections) can be allocated evenly, 50% to each "half," regardless of the actual distribution of a touch over that particular row. In a second embodiment, the half-row and half-column ratios between the two halves of a non-split row or column can be estimated by adopting the ratio from an adjacent split row or column to the non-split rows or columns, respectively. In a third embodiment, the grid of columns and rows is divided into four quadrants characterized by the sum (or average) of the signals of the subsections of the split row and column in each quadrant. The quadrant sum ratios can then be used to estimate the half-ratios between two virtual halves of each of the whole rows and columns.

DETAILED DESCRIPTION OF THE PREFERRED EMBODIMENTS

In the following description of preferred embodiments, reference is made to the accompanying drawings which form a part hereof, and in which it is shown by way of illustration specific embodiments which can be practiced. It is to be understood that other embodiments can be used and structural changes can be made without departing from the scope of the embodiments of this disclosure.

Embodiments of this disclosure provide modified projection-scan touch sensor panel hardware and corresponding methods for disambiguating the locations of multiple touches on these modified projection-scan touch sensor panels. In general, a modified projection-scan touch sensor panel is disclosed where a number of the electrodes (rows and/or columns) can be partitioned into multiple sections to aid in the disambiguation of multiple touches. With this type of electrode partition, a ratio of touch from a split conductive region (i.e., split columns and rows) can be determined and used to estimate the location of one or more touches on a non-split conductive region.

Among the many types of touch sensor panels currently available, capacitive touch sensing devices have been found to work particularly well in portable electronic devices. Generally speaking, whenever two electrically conductive members in a touch sensor panel come close to one another without actually touching, their electric fields can interact to form a sensing point having a particular capacitance. In the case of a capacitive touch device, as an object such as a finger approaches a touch sensing surface, a tiny capacitance can form between the object and the sensing points in close proximity to the object. By detecting changes in capacitance at each of the sensing points and noting the position of the sensing points, the sensing circuit can recognize multiple objects and determine parameters such as the location, pressure, direction speed and acceleration of the object as it is moved across the touch surface.

One type of capacitive touch sensor panel is a projection-scan self capacitive (i.e., projected self capacitance) touch sensor panel. In this type of touch sensor panel, each of the sensing points can be provided by an individually charged electrode. As an object approaches the surface of the touch device, the object can capacitively couple to those electrodes in close proximity to the object, thereby stealing charge away from the electrodes. The amount of charge in each of the electrodes can be measured by the sensing circuit to determine the positions of objects as they touch the touch sensitive surface.

Figure 1:
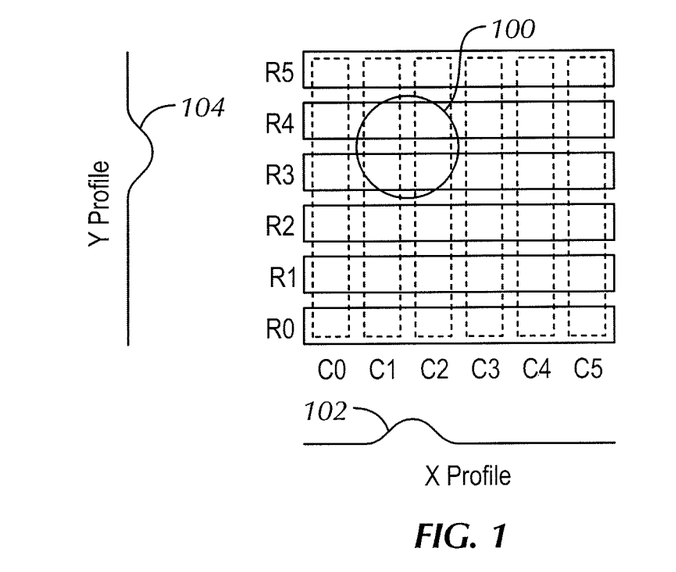
FIG. 1 illustrates an exemplary arrangement of rows and columns of a projection-scan touch sensor panel detecting a touch.

FIG. 1 illustrates an exemplary projection-scan self capacitive touch sensor panel. The electrodes in this panel can be arranged in a number of rows and columns, although other non-orthogonal arrangements are possible. The columns (C0-C5) shown in dotted lines and the rows (R0-R5) shown in solid lines can be on two different planes and are not in contact with each other. Although FIG. 1 shows six rows and six columns, it should be understood that any number of rows and columns can be included in the touch sensor panel.

With projection scan, a touch (or near touch) on the surface of the touch sensor panel can generate an X profile based on touch data collected from the columns and a Y profile based on touch data collected from the rows. As shown in FIG. 1, a single touch 100 detected on the touch sensor panel can be reflected by a first hump 102 in the X profile and a second hump 104 in the Y profile, the first and second humps corresponding to the column(s) and row(s) overlapping the touch, respectively. In this example, the first hump 102 shows a change in capacitance detected by columns C1 and C2. The second hump 104 shows a change in capacitance detected by rows R3 and R4. Accordingly, in the case of a single touch, a processor can determine the location of the touch based on the humps shown in the X and Y profiles.

Figure 2:
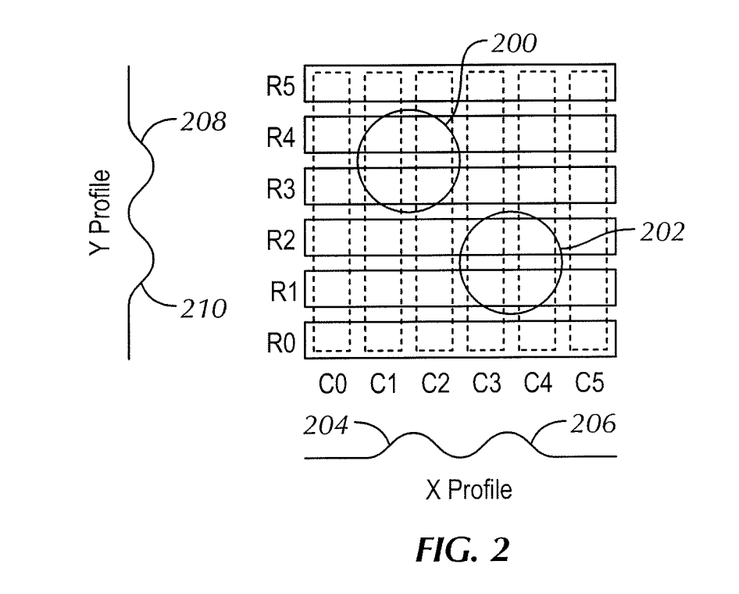
FIGS. 2 and 3 illustrate an example of rotational ambiguity in a projection-scan touch sensor panel.
Figure 3:
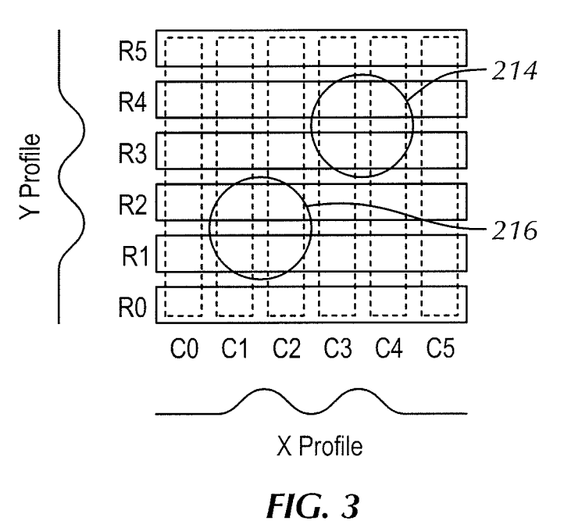

However, when there are multiple touches simultaneously detected on the touch sensor panel, the projection scan touch sensor panel such as the one shown in FIG. 1 may encounter ambiguity which can make it difficult, if not impossible, to determine the specific locations of the multiple touches. FIGS. 2 and 3 illustrate a typical scenario where rotational ambiguity may occur with a projection scan touch sensing system. FIG. 2 illustrates the X and Y profiles of two touches 200, 202 detected on the surface of the same touch sensor panel of FIG. 1. The X profile can include two distinct humps 204, 206 reflecting capacitance changes caused by the two touches 200, 202 and detected by the columns. In particular, hump 204 can reflect capacitance change detected by columns C1 and C2 in response to the first touch 200. Hump 206 can reflect capacitance changes detected by columns C3 and C4 in response to the second touch 202. Similarly, the Y profile can include two distinct humps 208, 210 showing capacitance changes caused by the same two touches, respectively, detected by the rows. Hump 208 corresponds to the first touch 200 detected by rows R3 and R4. Hump 210 corresponds to the second touch 202 detected by rows R1 and R2.

Rotational ambiguity can exist when another pair of touches at locations different from those shown in FIG. 2 also produces the same X and Y profiles shown in FIG. 2. For example, FIG. 3 illustrates two touches 214, 216 detected over areas different from those of the two touches 200, 202 of FIG. 2. In particular, touch 214 is detected in an area over rows R3, R4 and columns C3, C4. Touch 216 is detected in an area over rows R1, R2 and columns C1, C2. In other words, the touches 214, 216 of FIG. 3 can be seen as the touches 200, 202 of FIG. 2 rotated 90 degrees either clockwise or counter-clockwise. Nevertheless, the same X and Y profiles are produced in response to both pairs of touches detected over completely different areas of the touch sensor panel. Accordingly, it can be difficult, if not impossible for a processor processing the X and Y profiles to determine the exact locations of the touches because of this rotational ambiguity. As a result, the effectiveness of the touch sensor panel can be impaired if this ambiguity is not resolved.

Figure 4:
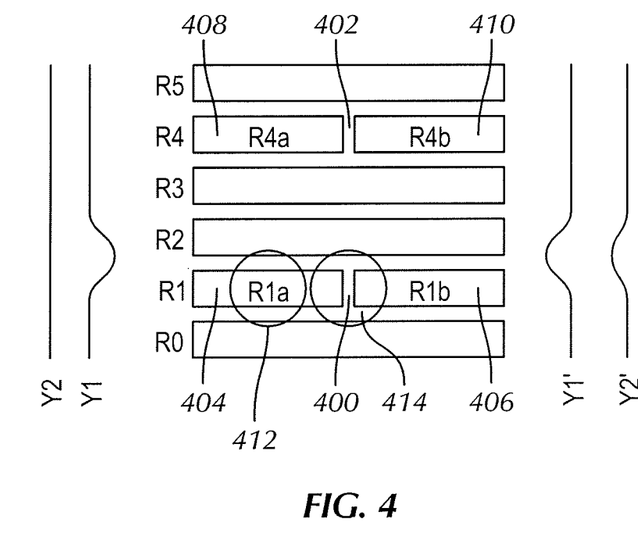
FIG. 4 illustrates the rows of an exemplary projection-scan touch sensor panel according to embodiments of the disclosure.

FIG. 4 illustrates six elongated electrodes (i.e., rows) oriented along a first dimension of a six-by-six projection-scan touch sensor panel according to an exemplary embodiment of the disclosure. The six elongated electrodes (i.e., columns) oriented along a second dimension are not illustrated in FIG. 4 for purposes of clarity. The omitted columns are illustrated separately in FIG. 5 and discussed below. Although the touch sensor panel is shown to include six rows of electrodes, it should be understood that the embodiment is not limited by the dimension of the touch sensor panel and may include a different number of rows. One skilled in the art can easily adopt the features disclosed in the illustrated embodiment to touch sensor panels of different sizes. Note also that in some embodiments, only the rows (or only the columns) can be present, but not both.

As shown in FIG. 4, the row electrodes R0-R5 are similar to those shown in FIGS. 1-3 except that rows R1 and R4 each include a break 400, 402 that splits each of rows R1 and R4 into two subsections (i.e., R1 is split into R1a 404 and R1b 406; R4 is split into R4a 408 and R4b 410). The rows that are physically split into two or more subsections by breaks are referred to as "split rows" hereinafter. Similarly, the columns that are physically split into two or more subsections (discussed hereinafter) are referred to as "split columns" hereinafter. The two subsections of each split row can produce their own Y profile (e.g., Y1 and Y2 for R1 and R4, respectively) each representing capacitance detected in an area over the respective subsections. For example, when a touch 412 is detected in an area over subsection R1a, the corresponding Y1 profile shows a hump reflecting a change in capacitance detected by subsection R1a. In contrast, no hump is shown in the Y2 profile because no capacitance change was detected by the subsection R1b which does not overlap with the touch 412. As a result, a touch over subsection R1a can be distinguished from a touch over subsection R1b. Similarly, a touch over subsection R4a can be distinguished from a touch over subsection R4b.

When a touch is detected by both subsections of the same split row, both of the corresponding Y profiles can show a hump. For example, FIG. 4 shows a second touch 414 at least partially overlapping both subsections R1a and R1b. As a result, both of the Y1' and Y2' profiles can show a hump because the change in capacitance resulted from the touch 414 can be detected by both subsections R1a and R1b. Because the touch is spread between the two subsections of the split row, the magnitude of the resulting change in capacitance detected by either subsection can be smaller than that of the touch 412 detected solely by R1a. Thus, the humps of profiles Y1' and Y2' can be lower than the one in profile Y1.

According to this embodiment, when a touch (e.g., the second touch 414) is over both subsections R1a 404, R1b 406 of the split row R1, a half-row ratio (R1a:R1b) between the capacitances measurements from subsections 404, 406 can be determined. That is, the ratio between the hump value of Y1' and hump value of Y2' can be calculated to reflect the breakdown of how a touch is spread over the two subsections R1a and R1b of a split row R1. For example, a ratio of 20% to 80% can be interpreted as that twenty percent of the touch 414 is over subsection R1a and eighty percent of the touch 414 is over subsection R1b. When the touch is entirely over one of the subsections, the ratio can be 100% to 0%. This ratio is not only important for determining the location of the touch with respect to the split conductive region (e.g., split rows R1 and R4 of FIG. 4), it can also be used to estimate the location of the touch over a non-split conductive region (e.g., non-split rows R0, R2, R3, and R6) as detailed later in this application.

As shown in FIG. 4, the breaks split the rows evenly so that each of the subsections accounts for half of the row. However, in some embodiments, the breaks do not necessarily have to evenly divide the rows to two halves. Depending on where the break is in a particular split row, the ratio between the capacitance measurements of the two subsections can be adjusted accordingly to take into account the location of the break in the row.

Figure 5:
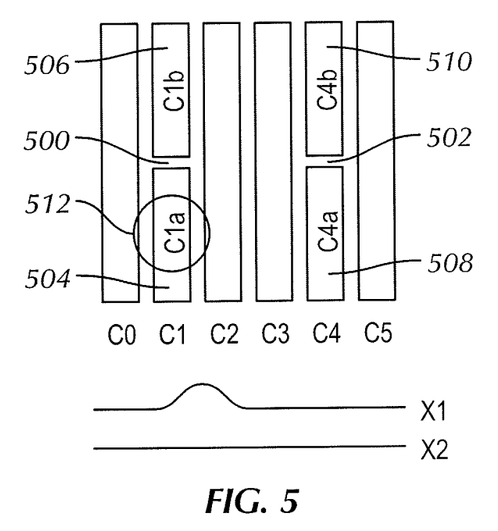
FIG. 5 illustrates the columns of an exemplary projection-scan touch sensor panel according to embodiments of the disclosure.

The same feature of using breaks to divide one or more row electrodes as shown in FIG. 4 and discussed above can also be incorporated into one or more of the columns of the projection-scan touch sensor as shown in FIG. 5. FIG. 5 illustrates the six columns R0-R5 of the same six-by-six touch projection-scan sensor panel of FIG. 4 (the rows are not shown in FIG. 5 for purposes of clarity). Similar to the rows of FIG. 4, two of the six columns, C1 and C4, can include breaks 500, 502, respectively, which split the columns into two equal subsections (C1a 504 and C1b 506 for C1, C4a 508 and C4b for C2). The breaks in these split columns can similarly generate two separate X profiles (X1, X2) each corresponding to the capacitance measurement from one of the subsections (e.g., C1a, C1b). For example, when a touch 512 is detected over subsection C1a, the X1 profile of FIG. 5 shows a hump reflecting a change in capacitance detected by subsection C1a. In contrast, the X2 profile of FIG. 5 shows no hump because the touch did not overlap with C1b and thus no capacitance change was detected by subsection C1b. As a result, a touch over the subsection C1a can be distinguished from a touch over the subsection C1b. Similarly, a touch over the subsection C4a can be distinguished from a touch over the subsection C4b.

In addition, a half-column ratio between the capacitances measurements from each subsection C1a 404 and C1b 406 can be determined in the same fashion as discussed above with regard to the half-row ratio. The half-column ratio can also be used for determining the location of the touch with respect to the split conductive region (e.g., columns C1 and C4 of FIG. 5) and also for estimating the location of the touch over a non-split conductive region (e.g., columns C0, C2, C3, and C6) as detailed below.

In various embodiments, different rows and columns of a projection-scan touch sensor panel can be split into subsections as discussed above. In addition, different numbers of the rows and/or columns can be split into two or more subsections. If a row or column is split to more than two subsections, the ratio can be calculated among all of the subsections and reflect the portions of a touch over each subsection. However, the number of breaks in a projection-scan touch sensor panel can be kept to a minimum while still collecting enough data to enable the processor to disambiguate multiple touches on the panel (i.e., to avoid rotational ambiguity caused by multiple touches detected simultaneously.) One advantage of keeping the number of breaks to a minimum is that, for every additional break in a row, an extra sensor channel may be needed on the controller, thus increasing the size of the chip set of the touch sensor panel. This can create a problem, especially in small touch sensor panels where extra space is hard to find. Hence, to minimize the number of breaks needed for disambiguating multiple touches, the breaks can be incorporated into certain rows and columns to ensure that a touch can always overlap with a single row split and a single column split regardless of the location of the touch on the surface of the touch sensor panel.

For example, in the relatively small six-by-six touch sensor panel of FIGS. 4 and 5, each row and column can have a width of approximately one third of that of an adult finger tip. That is, the area of an adult finger tip touching the touch sensor panel would typically overlap, at least partially, with three of the columns and three of the rows of the touch sensor panel. Therefore, by strategically placing the breaks in rows R1 and R4 and columns C1 and C4 as shown in FIGS. 4 and 5, it can ensure that when a finger tip touches the touch sensor panel, the touch area will overlap with at least one row split and one column split. For larger touch sensor panels or touch sensor panels designed to detect touches by objects having different surface areas, the number of breaks and the location of breaks can vary accordingly as long as a touch anywhere on the touch surface can overlap with at least one row split and one column split. The length and width of the rows and columns may also affect the number and location of the splits to be incorporated.

Figure 6:
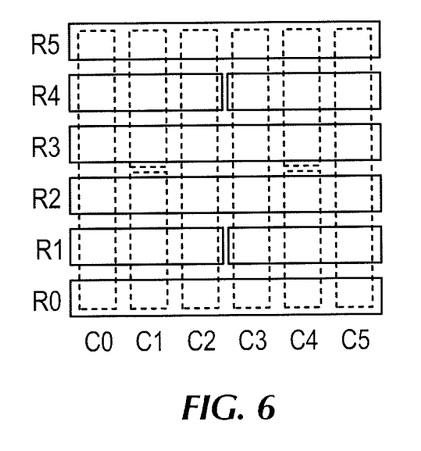
FIG. 6 combines the rows of FIG. 4 and columns of FIG. 5 to provide a full illustration of an exemplary projection-scan touch sensor panel according to embodiments of the disclosure.

FIG. 6 illustrates an exemplary full six-by-six projection-scan touch sensor panel that combines the rows of FIG. 4 and the columns of FIG. 5. The sensor readings from the split rows and columns and the whole rows and columns (i.e., rows and columns which do not have a break to split them into multiple sections) can be reported to a processor which in turn can generate the corresponding X and Y profiles. A full two-dimensional multi-touch image of arrays of touch pixels can then be reconstructed based on data extracted from the X and Y profiles by any known method. To generate a multi-touch image that can accurately identify the locations of the multiple touches without encountering rotational ambiguity, it can be important to also be able to estimate the distribution of a touch over the whole rows and columns (i.e., rows and columns not physically split in half). For example, it can be helpful to know how a touch is spread between the left and right halves of rows R0, R2, R3, and R5 and between the top or bottom halves of columns C0, C2, C3, and C5 even though a ratio between these half rows or columns can not be calculated directly based on measured data, because without any physical breaks in them, only one measurement is captured for an entire row or column. Therefore, the half-row and half-column ratios for the whole rows and columns have to be estimated. The following paragraphs disclose various methods of making these estimates. These estimates together with the actual half-row and half-column ratios of the split rows and split columns can produce a full multi-touch image of arrays of touch pixels.

Figure 7A:
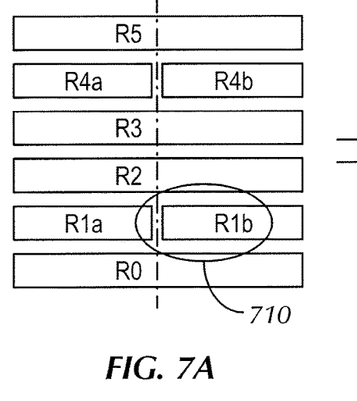
FIGS. 7a and 7b illustrate a method of estimating split data for virtual split rows of a projection-scan touch sensor panel according to embodiments of the disclosure.

There are a number of methods to estimate the distribution of a touch over a whole row or column according to embodiments of this disclosure. In a first embodiment, the signal detected by a whole row (i.e., a row with not physically split into subsections) can be allocated evenly, 50% to each "half," regardless of the actual distribution of a touch over that particular row. That is, the ratio between the two "halves" of all of the whole rows can be universally set to 50:50. FIG. 7a illustrates the physical partition of the rows of the same 6×6 touch sensor panel of FIGS. 4 and 6. As illustrated, rows R1 and R4 are the split rows each physically broken into two subsections. The distribution of a touch 710 over the split row R1 can be determined by calculating a half-row ratio based on the Y profiles associated with the two subsections as discussed above. In this case, the ratio between R1a and R1b can be 20:80. As noted previously, a touch by an adult's finger tip typically can overlap, at least partially, three rows of the touch sensor panel. Thus, the touch 710 shown in FIG. 7 can also affect the signals detected by rows R0 and R2. Because rows R0 and R2 do not have physical breaks splitting them into halves, only one signal is received by the entire row (i.e., only one Y profile is available for the row). Thus, it can be difficult, if not impossible, to ascertain the actual distribution of the touch 710 over the left and right halves of rows R0 and R2.

Figure 7B:
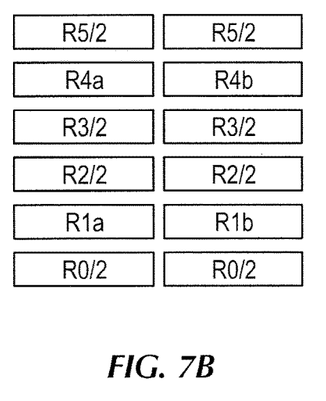

According to this first embodiment, the signal of each of these rows R0 and R2 (and any other whole rows) can be evenly divided between their left and right "halves." As shown in FIG. 7b, each of the whole rows (i.e., R0, R2, R3, and R5) can be virtually split into two "halves," each allocated 50% of the signal detected by the entire physical row. For example, each of the left and right halves of row R0 can be estimated to have a signal value of R0/2, half of the total value of the signal R0 for the entire row R0. In other words, the ratio between each of the virtual halves of R0 can be 50:50. Similarly, the other non-split rows R2, R3, and R5 can also be split virtually into two half-sections with the signal of the entire physical row divided evenly between the two virtual halves. As shown in FIG. 7b, the two virtual halves of R2 can each have a signal value of R2/2. The two virtual halves of R3 can each have signal value of R3/2. The two virtual halves of R5 can each have a signal value of R5/2. In comparison, the signal for each half of the split rows R1 and R4 can be the actual signal detected on that half. That is, the subsections of the split rows R1 and R4 do not necessarily have half of the signal of the entire row. In some embodiments, to avoid loss of precision in integer arithmetic, the signal value of the split row can be doubled instead of dividing the value of a whole row in half for its virtual halves as discussed above. It should also be understood that the same method disclosed above with regard to the rows of a touch sensor panel can also be applied to the columns of the touch sensor panel.

Although the method discussed above can produce an estimated half-row and half-column ratio for each of the whole rows and columns not physically split in half, the 50:50 ratio universally assigned to each of these whole rows and columns can be crude estimates and can be significantly off from the actual ratio between their two halves if they were actually split into two halves. Referring to the example shown in FIG. 7a, the two halves of row R0 can be assigned a ratio of 50:50 according to the method of the first embodiment. However, the figure shows that most of the touch 710 is over the right half of R0 with maybe a relatively small portion over the left half. Accordingly, the actual ratio between the capacitance measurements from the left half and the right half of row R0, if there is a physical split, can be close to, for example, 10:90, which differs significantly from the estimated 50:50 ratio. This may in turn affect the subsequent calculation of the precise location of the touch 710. As such, the 50/50 estimated ratio for all rows and columns not physically split into subsections may not accurately reflect the distribution of a touch over each half of the row or column.

Figure 8A:
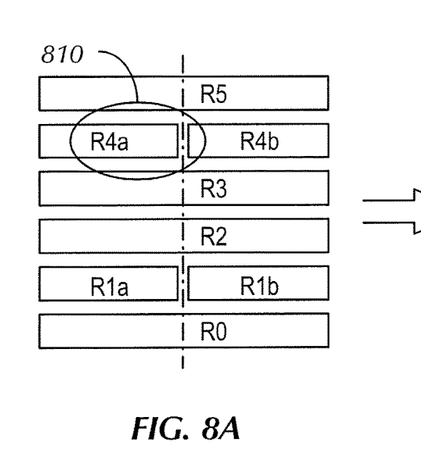
FIGS. 8a and 8b illustrate another method of estimating split data for virtual split rows of a projection-scan touch sensor panel based on split data of physically split rows of the panel, according to embodiments of the disclosure.

The method of the second embodiment can significantly improve the estimates of the half-row and half-column ratios between the two halves of a non-split row or column by adopting the ratio from an adjacent split row or column to the non-split rows or columns, respectively. FIG. 8a illustrates the rows of the 6×6 touch sensor panel previously shown in FIGS. 4, 6, and 7a. As described above, rows R1 and R4 can be physically split into two half subsections. The other rows R0, R2, R3, and R5 can be the whole rows with no breaks physically dividing them into subsections. In order to create a 6×2 touch image, the whole rows can again be virtually split in half as shown on in FIG. 8b. However, instead of universally assigning a 50/50 half-row ratio to the two virtual halves of each of the whole rows R0, R2, R3, and R5 as described in the first embodiment, the half-row ratio of an adjacent split row can be copied over to the whole rows.

Figure 8B:
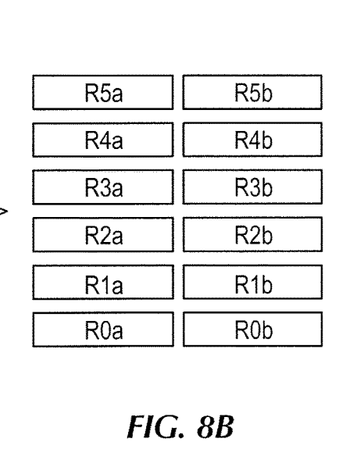

For example, the virtual halves R0a and R0b of row R0 and R2a and R2b of row R2 can have the same half-row ratio of the split row R1, which is adjacent to both rows R0 and R2. Similarly, the virtual halves R3a and R3b of R3 and R5a and R5*b* of R5 can have the same half-row ratio of the split row R4. In one embodiment, the following formulas can be used to calculate the signal value of the virtual halves R0*a*, R0*b*, R2*a*, R2*b*, R3*a*, R3*b*, R5*a*, and R5*b*.

$$R0a=R0*R1a/(R1a+R1b)$$

$$R0b=R0*R1b/(R1a+R1b)$$

$$R2a=R2*R1a/(R1a+R1b)$$

$$R2b=R2*R1b/(R1a+R1b)$$

$$R3a=R3*R4a/(R4a+R4b)$$

$$R3b=R3*R4b/(R4a+R4b)$$

$$R5a=R5*R4a/(R4a+R4b)$$

$$R5b=R5*R4b/(R4a+R4b)$$

In this second embodiment, the half-row ratio of a split-row can be copied to the adjacent whole rows to provide a better estimate of the touch location. The reason that this approach can be effective for estimating the ratio between the virtual halves of the whole rows is that a touch by an adult finger tip tends to overlap, at least partially, with three rows of the touch sensor panel. Given that the touch sensor panels according to embodiments of this disclosure can be designed so that at least one split row is under a touch detected anywhere on the touch sensor panel, the whole row(s) adjacent to that one split row is likely to have approximately the same ratio between their two virtual halves. For example, the touch 810 of FIG. 8 overlaps with rows R3-R5. As illustrated in the figure, the ratio between the area of the left subsection of R5 (i.e., R5*a* in FIG. 8*b*) overlapping with the touch area and the area of the right half of R5 (i.e., R5*b* in FIG. 8*b*) overlapping with the touch area can be close to the half-ratio between the subsections of the two subsections (R4*a* and R4*b*) of the adjacent split row R4. The same is true when comparing R3 and R4. Accordingly, the actual half-row ratio from the split row R4 can be copied to the adjacent whole rows R3 and R5 to generate estimated half-ratios for the whole rows R3 and R5 that can be more accurate than the universally assigned 50:50 ratio of the first embodiment. As a result, the 6×2 matrix shown in FIG. 8*b* can produce a more accurate touch image than the 6×2 matrix shown in FIG. 7*b*. It should be understood that the same method of the second embodiment can also be applied to the column electrodes of the touch sensor panel.

Figure 9A:
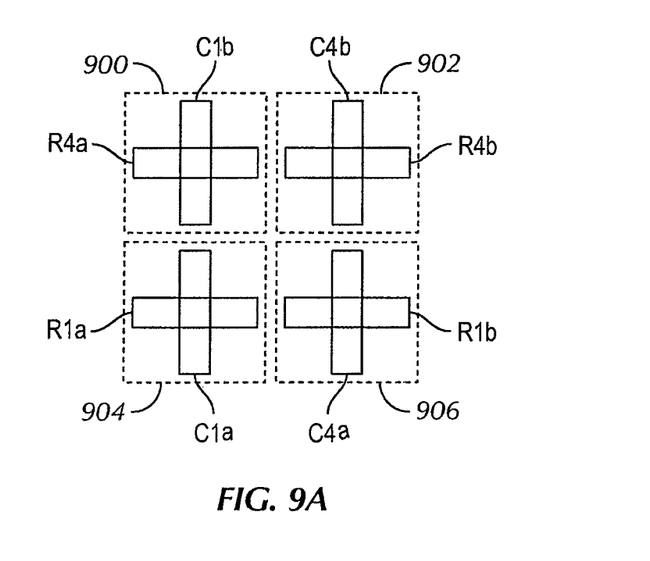
FIGS. 9a-c illustrate yet another method of estimating split data for virtual split rows and columns of a projection-scan touch sensor panel based on split data of physically split rows and columns of the panel, according to embodiments of the disclosure.

An even more accurate estimate can be obtained by dividing the grid of columns and rows into four quadrants characterized by the sum (or average) of the signals of the subsections of the split row and column in each quadrant, according to a third embodiment. FIG. 9*a* divides the 6×6 touch sensor panel of FIG. 6 into four quadrants 900, 902, 904, 906. Each quadrant 900, 902, 904, 906 can include one subsection of a split row and one subsection of a split column. For example, quadrant 900 can include the top subsection C1*a* of split column C1 and the left subsection R4*a* of split row R4. Quadrant 902 can include the top subsection C4*a* of split column C4 and right subsection R4*b* of split row R4. Quadrant 904 can include the bottom subsection C1*b* of split row C1 and left subsection R1*a* of split row R1. Quadrant 906 can include the bottom subsection C4*b* of split column C4 and right subsection R1*b* of split row R1.

According to this embodiment, a quadrant sum ratio for each quadrant 900, 902, 904, 906 can be calculated based on the half-column and half-row subsections within the quadrant. For example, the sums Qba, Qbb, Qaa, and Qab for quadrants 900, 902, 904, and 906, respectively, can be calculated using the following formulas:

$$Qba=R4a+C1b$$

$$Qbb=R4b+C4b$$

$$Qaa=R1a+C1a$$

$$Qab=R1b+C4a$$

Figure 9B:
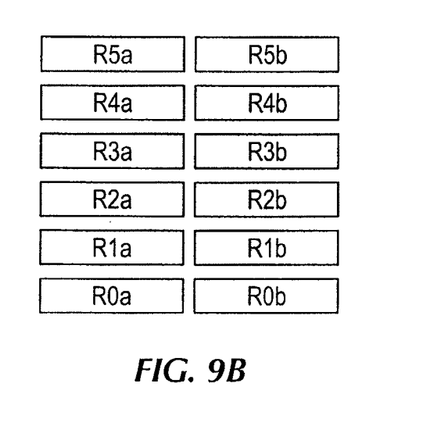

The quadrant sum ratios Qba, Qbb, Qaa, and Qab can then be used to estimate the half-ratios between two virtual halves of each of the whole rows and columns. The rows of the 6×6 panel are illustrated in FIG. 9*b*. As in FIGS. 7*b* and 8*b*, only split rows R1 and R4 have actual physical breaks that split them into subsections (R1*a*, R1*b*) and (R4*a*, R4*b*), respectively. The other rows R0, R2, R3, and R5 are only split virtually into two subsections for the purpose of creating a 6×2 array. However, for reasons discussed above, the half-ratio between two virtual subsections of a whole row cannot be ascertained from data measured by that row alone and must be estimated using the calculated quadrant sum ratios, according to this embodiment. For example, the ratios of the virtual split rows R0, R2, R3, and R5 can be estimated using the following set of formulas:

$$R0a=R0*Qaa/(Qaa+Qab)$$

$$R0b=R0*Qab/(Qaa+Qab)$$

$$R2a=R2*Qaa/(Qaa+Qab)$$

$$R2b=R2*Qab/(Qaa+Qab)$$

$$R3a=R3*Qba/(Qba+Qbb)$$

$$R3b=R3*Qbb/(Qba+Qbb)$$

$$R5a=R5*Qba/(Qba+Qbb)$$

$$R5b=R5*Qbb/(Qba+Qbb)$$

As a result, a half-ratio between the two halves of each row can be obtained for all split rows and whole rows. The resulting 6×2 array can be used to determining the locations of multiple touches detected on the touch sensor panel in the X-direction.

Figure 9C:
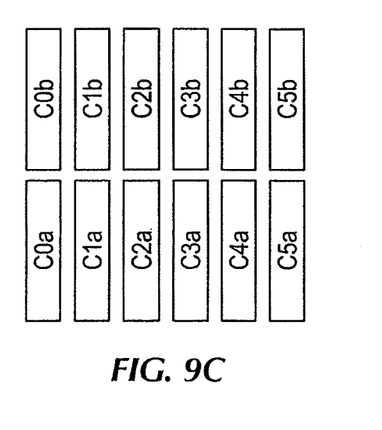

The same process can be repeated for the columns to create a similar 2×6 set of virtual split columns, as shown in FIG. 9*c*. Here, the whole columns C0, C2, C3, and C5 can be divided virtually into two subsections (C0*a*, C0*b*), (C1*a*, C1*b*), (C2*a*, C2*b*), and (C3*a*, C3*b*), respectively. Columns C1 and C4 can be split-rows each divided into two subsections (C1*a*, C1*b*) and (C4*a*, C4*b*), respectively. As with the rows, the ratios between two physical subsections of a split row (e.g., C1*a* and C1*b*) can be calculated based on actual data captured by these subsections. The ratios between two virtual subsections of a whole row can be estimated using the calculated quadrant sum ratios disclosed above. For example, the ratios of the virtual split columns C0, C2, C3, and C5 can be estimated using the following set of formulas:

$$C0a=C0*Qaa/(Qaa+Qba)$$

$$C0b=C0*Qab/(Qaa+Qba)$$

$$C2a=C2*Qaa/(Qaa+Qba)$$

$$C2b=C2*Qab/(Qaa+Qba)$$

$$C3a=C3*Qba/(Qab+Qbb)$$

$$C3b=C3*Qbb/(Qab+Qbb)$$

$$C5a=C5*Qba/(Qab+Qbb)$$

$$C5b=C5*Qbb/(Qab+Qbb)$$

As a result, a ratio between the two halves of each column can be obtained for all columns regardless of whether a column is physically split into two subsections. The resulting 2×6 array as shown in FIG. 9c can be used to determining the location of multiple touches detected on the touch sensor panel in the Y-direction.

The method of the third embodiment disclosed above can be more accurate that the methods of the first two embodiments because it not only takes into consideration the ratio of the adjacent rows (as does the method of the second embodiment), but also includes a column components in the formula by using quadrant sums (or averages) calculated from both columns and rows data.

Although three different methods for estimating half-ratios for whole rows and columns are disclosed above, it should be understood that other formulas and variations based on the same concept can also be used to achieve the same purpose. The methods disclosed in these embodiments are designed so that multiple touches can be processed on a projection-scan touch sensor panel without rotational ambiguity and with a minimum number of splits built into the physical rows and columns of the touch sensor panel.

After estimates are attained for all the virtually split rows and columns using methods disclosed in any of the three embodiments described above or any other suitable method, a full two-dimensional multi-touch image of arrays of touch pixels can then be generated from these estimates and the physically split rows and columns of the touch sensor panel.

Figure 9D:
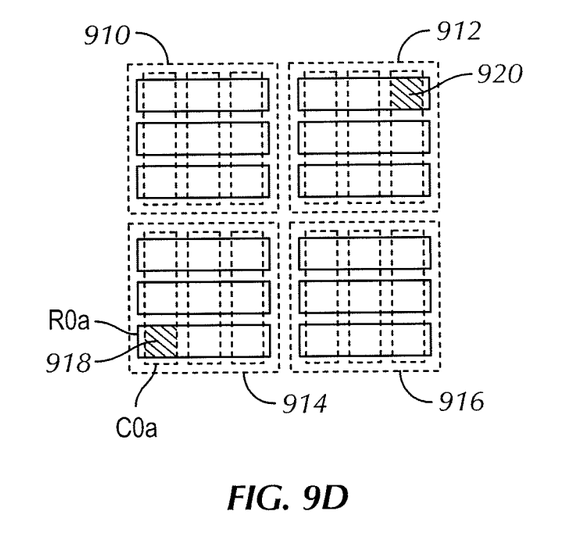
FIGS. 9d-f illustrate a method of generating a full two-dimensional multi-touch image of touch pixels, according to embodiments of the disclosure.

For example, in the embodiment illustrated in FIGS. 9a-c, the 6×2 array of FIG. 9b and the 2×6 array of FIG. 9c can be combined to form a full touch sensor panel with four 3×3 quadrants 910, 912, 914, 916 as shown in FIG. 9d. Each of the nine intersections of each 3×3 quadrant 910, 912, 914, 916 can be a touch pixel of the multi-touch image. For example, the intersection of virtual half-row R0a and virtual half-column C0a can form touch pixel[0][0] 918. Each touch pixel can be estimated or calculated by adding or averaging two values V1 and V2. The first value V1 can be obtained by weighting the pixel's half-row value by the pixel's half-column's fraction of the total of the half-columns in the quadrant. The second value V2 can be obtained by weighting the pixel's half-column value by the pixel's half-row's fraction of the total of the half-rows in the quadrant.

Figure 9E:
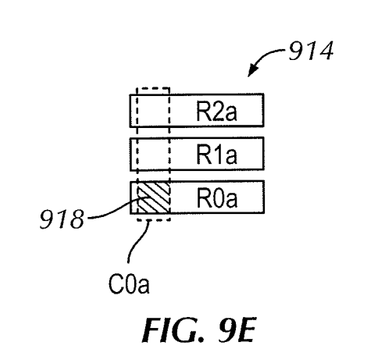
Figure 9F:
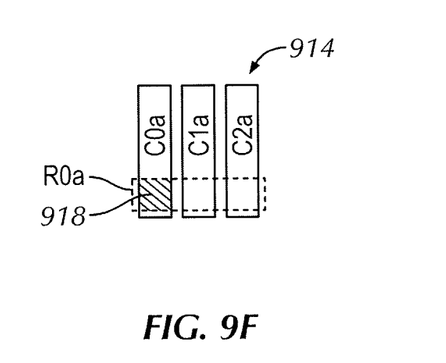

FIGS. 9e and 9f provide enhanced views of the half-rows and half-columns of one of the quadrants 914 of FIG. 9d. FIG. 9e illustrates the half-column component C0a of pixel [0][0] 918 and the three half-rows R0a, R1a, and R2a of quadrant 914. The first value V1 can be calculated using the formula:

$$V1=C0a*R0a/(R0a+R1a+R2a)$$

FIG. 9f illustrates the half-row component R0a of pixel [0][0] 918 and the three half-columns C0a, C1a, and C2a of quadrant 914. The second value V2 can be calculated using the formula:

$$V2=C0a*R0a/(C0a+C1a+C2a)$$

The values V1 and V2 can be essentially the product of the half-row and half-column values normalized by the quadrant totals. The quadrant half-column total and the quadrant half-row total can be different as a result of the virtual split estimation process disclosed above. The two values V1 and V2 can then be summed or averaged to generate a value representing the pixel[0][0] 918.

Other touch pixels can be calculated using similar formulas. For example, referring back to FIG. 9d, pixel[6][6] 920 can be calculated by:

$$Pixel[6][6]=C6b*R6b/(R4b+R5b+R6b)+C6b*R6b/(C4b+C5b+C6b)$$

As such, a full two-dimensional (e.g., 6×6) multi-touch image of arrays of touch pixels can then be generated from the virtually and physically split rows and columns. Although FIGS. 9d-f illustrate the touch image construction process based on the 6×2 array of FIG. 9b and the 2×6 array of FIG. 9c, it should be understood that the same method can also be applied to any arrays of virtually and physically split rows and columns such as the ones shown in FIGS. 7b and 8b.

Figure 10A:
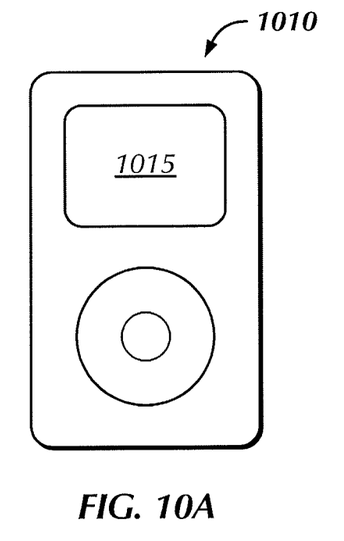
FIG. 10a illustrates an exemplary digital media player having a projection-scan touch sensor panel according to embodiments of the disclosure.

FIG. 10a illustrates exemplary digital media player 1010 that can include a projection-scan touch sensor panel 1015 according to embodiments of the disclosure.

Figure 10B:
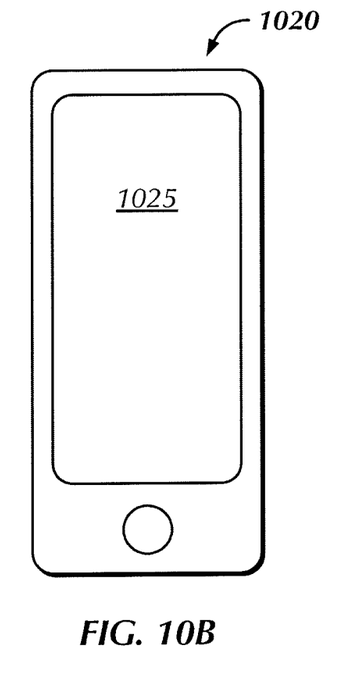
FIG. 10*b* illustrates an exemplary mobile telephone having a projection-scan touch sensor panel according to embodiments of the disclosure.

FIG. 10b illustrates exemplary mobile telephone 1020 that can include a projection-scan touch sensor panel 1025 according to embodiments of the disclosure.

Figure 10C:
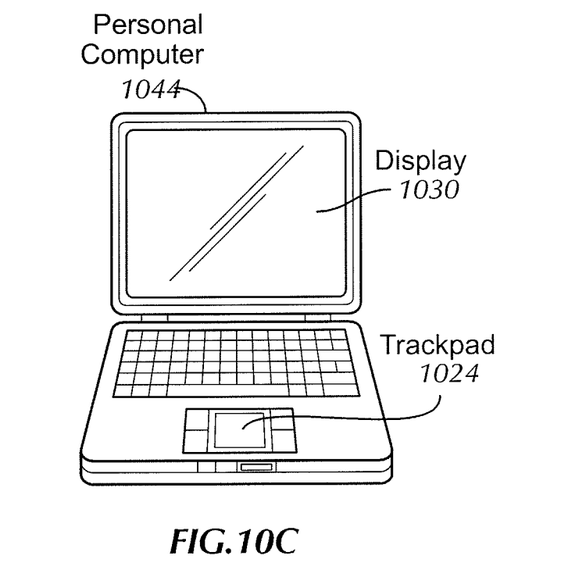
FIG. 10*c* illustrates an exemplary mobile computer having a projection-scan touch sensor panel according to embodiments of the disclosure.

FIG. 10c illustrates an exemplary personal computer 1044 that can include touch sensor panel 1024 and display device 1030. The touch sensor panel 1024 can be a projection-scan touch sensor panel according to embodiments of the disclosure. The display device 1030 can also include a projection scan touch sensor panel according to embodiments of the disclosure.

Figure 10D:
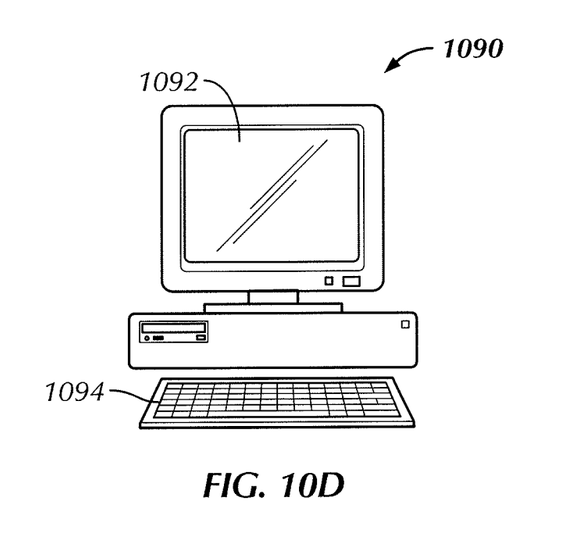
FIG. 10*d* illustrates an exemplary desktop computer having a projection-scan touch sensor panel according to embodiments of the disclosure.

FIG. 10d illustrates a desktop computer 1090 including a display device 1092. The display device 1092 may include a projection-scan panel according to embodiments of the disclosure. The desktop computer 1090 may also include a virtual keyboard 1094 which incorporates a projection scan touch sensor panel according to embodiments of the disclosure.

Figure 11:
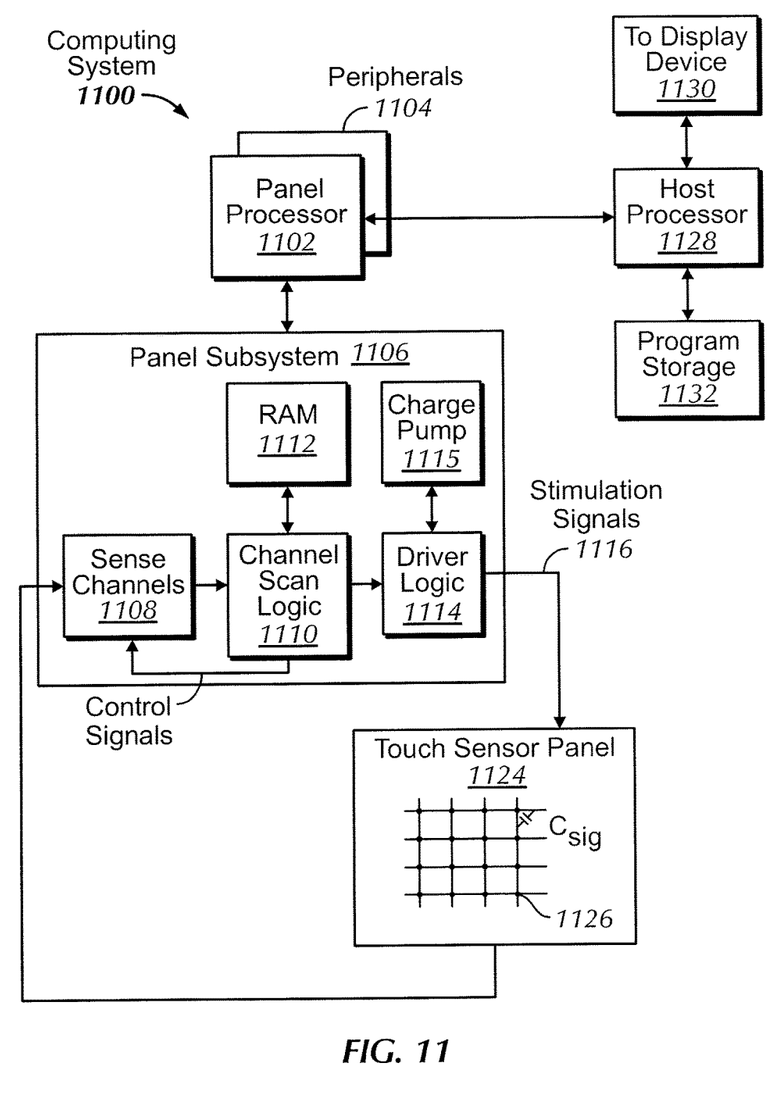
FIG. 11 illustrates an exemplary computing system including a projection-scan touch sensor panel according to embodiments of the disclosure.

FIG. 11 illustrates exemplary computing system 1100 that can include one or more projection scan touch sensor panels according to the embodiments of the disclosure described above. Computing system 1100 can include one or more panel processors 1102 and peripherals 1104, and panel subsystem 1106. Peripherals 1104 can include, but are not limited to, random access memory (RAM) or other types of memory or storage, watchdog timers and the like. Panel subsystem 1106 can include, but is not limited to, one or more sense channels 1108, channel scan logic 1110 and driver logic 1114. Channel scan logic 1110 can access RAM 1112, autonomously read data from the sense channels and provide control for the sense channels. In addition, channel scan logic 1110 can control driver logic 1114 to generate stimulation signals 1116 at various frequencies and phases that can be selectively applied to drive lines of touch sensor panel 1124. In some embodiments, panel subsystem 1106, panel processor 1102 and peripherals 1104 can be integrated into a single application specific integrated circuit (ASIC).

Computing system 1100 can also include host processor 1128 for receiving outputs from panel processor 1102 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/ or the like. Host processor 1128 can also perform additional functions that may not be related to panel processing, and can be coupled to program storage 1132 and display device 1130 such as an LCD panel for providing a UI to a user of the device. Display device 1130 together with touch sensor panel 1124, when located partially or entirely under the touch sensor panel, can form touch screen 1118.

Note that one or more of the functions described above can be performed by firmware stored in memory (e.g. one of the peripherals 1104 in FIG. 11) and executed by panel processor 1102, or stored in program storage 1132 and executed by host processor 1128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A touch sensor panel comprising:
    a plurality of rows formed on a first layer and comprising at least one non-split row and at least one split row including a plurality of row subsections; and
    a plurality of columns formed on a second layer and comprising at least one non-split column and at least one split column including a plurality of column subsections;
    wherein the touch sensor panel is configured with at least one split row and at least one split column located such that a touch anywhere on the touch sensor panel at least partially overlaps with at least one split row and at least one split column, and
    wherein the rows and columns are individually charged electrodes capable of detecting a change in capacitance in a corresponding area of the touch sensor panel and wherein at least one row overlaps with at least one column.

2. The touch sensor panel of claim 1, wherein the at least one split row and the at least one split column in the touch sensor panel are located such that a touch anywhere on the touch sensor panel at least partially overlaps with only one split row and one split column.

3. The touch sensor panel of claim 1, the touch sensor panel further configured with a minimum a number of split rows so that a touch anywhere on the touch sensor panel overlaps with one and only one split row.

4. The touch sensor panel of claim 1, the touch sensor panel further configured with a minimum a number of split columns so that a touch anywhere on the touch sensor panel overlaps with one and only one split column.

5. The touch sensor panel of claim 1, the touch sensor panel communicatively coupled to a processor configured for generating individual profiles for each subsection of a split row or split column.

6. The touch sensor panel of claim 1, the touch sensor panel communicatively coupled to a processor configured for calculating a ratio between signals detected by the subsections of a split row or split column.

7. The touch sensor panel of claim 1, the touch sensor panel communicatively coupled to a processor configured for estimating a location of a touch on a non-split conductive region.

8. The touch sensor panel of claim 7, wherein the non-split conductive region comprises an undivided whole row or an undivided whole column.

9. The touch sensor panel of claim 8, wherein the processor is further configured for estimating the location of the touch on the non-split conductive region by using a ratio between signals detected by subsections of a split row or split column adjacent to the non-split conductive region.

10. The touch sensor panel of claim 8, wherein the processor is further configured for estimating the location of the touch on the non-split conductive region by using a ratio between signals detected by subsections of a split row and a ratio between signals detected by subsections of a split column.

11. The touch sensor panel of claim 1, the touch sensor panel communicatively coupled to a processor configured for generating a multi-touch image that is a two-dimensional array of touch pixels from the at least one split row and the at least one split column.

12. The touch sensor panel of claim 1, wherein the touch sensor panel is a self-capacitive touch sensor panel.

13. A touch sensor panel comprising:
    at least one split elongated electrode including a plurality of electrode subsections separated by one or more breaks, each subsection capable of generating a separate touch signal; and
    at least one non-split elongated electrode adjacent and in parallel to the at least one split elongated electrode, each non-split elongated electrode capable of generating a separate touch signal, wherein the at least one split elongated electrode is located such that a touch anywhere on the touch sensor panel at least partially overlaps at least one split elongated electrode; and wherein a ratio between touch signals detected by the electrode subsections of at least one split elongated electrode is used for estimating the location of a touch on the at least one non-split elongated electrode.

14. The touch sensor panel of claim 13, the touch sensor panel communicatively coupled to a processor configured for generating individual profiles for each electrode subsection of the at least one split elongated electrode.

15. The touch sensor panel of claim 13, wherein the touch sensor panel is a self-capacitive touch sensor panel.

16. A method for touch location detection on a touch sensor panel, the touch sensor panel including a split conductive region adjacent to a non-split conductive region, the split conductive region and the non-split conductive region on a same layer, the method comprising:

determining a signal ratio of subsections of the split conductive region;

applying the signal ratio to virtual subsections of the non-split conductive region adjacent to the split conductive region on the same layer; and estimating a location of touch on the non-split conductive region in response to the signal ratio applied to the virtual subsections of the non-split conductive region.

17. The method of claim 16, wherein the non-split conductive region comprises at least a whole row electrode or a whole column electrode.

18. The method of claim 16, wherein the split conductive region comprises a split row electrode or a split column electrode.

19. The method of claim 16, wherein applying the signal ratio comprises dividing a signal of the non-split conductive region between at least two virtual subsections of the non-split conductive region in accordance with the signal ratio.

20. A method for touch location detection on a touch sensor panel, the touch sensor panel including a plurality of rows on a first layer, at least one of which being a split row and another being a non-split row, and a plurality of columns on a second layer, at least one of which being a split column and another being a non-split column and at least one row overlapping with at least one column, the method comprising:

dividing the touch sensor panel into a plurality of sections, each of the plurality of sections overlapping, at least partially, one of the at least one split row and one of the at least one split column;

calculating a sum or an average for each of the plurality of sections in response to signals from the one split row and one split column;

calculating a split ratio for each of the plurality of columns and rows in response to the calculated sums or averages of the sections; and determining a location of touch on the touch sensor panel based on the split ratios of the plurality of columns and rows.

21. The method of claim 20, the touch sensor panel divided into four quadrants, each of the quadrants overlapping one split row and one split column, the method further comprising calculating the sum or average for each of the quadrants in response to signals from the one split row and one split column.

22. The method of claim 20, wherein calculating the split ratios further comprises calculating a ratio between the quadrant sums or averages of two adjacent quadrants.

23. The method of claim 20, further comprising minimizing a number of the split rows and a number of the split columns so that a touch anywhere on the touch sensor panel overlaps only one split row and one split column.

24. A method for touch location detection on a touch sensor panel, the touch sensor panel including a split conductive region adjacent to a co-planar non-split conductive region, the method comprising:

determining a signal ratio of subsections of the split conductive region;

allocating a pre-defined signal ratio to virtual subsections of the co-planar non-split conductive region adjacent to the split conductive region; and determining a location of touch on the touch sensor panel in response to the signal ratios of the subsections of the split conductive region and the pre-defined signal ratio of the virtual subsections of the non-split conductive region.

25. The method of claim 24, wherein the pre-defined signal ratio is 50:50.

* * * * *